United States Patent
Hamada et al.

(10) Patent No.: US 10,655,574 B2
(45) Date of Patent: May 19, 2020

(54) SIDE-BY-SIDE VEHICLE

(71) Applicant: KAWASAKI JUKOGYO KABUSHIKI KAISHA, Kobe-shi, Hyogo (JP)

(72) Inventors: Ayumi Hamada, Kakogawa (JP); Hidefumi Yasuhara, Foothill Ranch, CA (US)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 83 days.

(21) Appl. No.: 16/132,204

(22) Filed: Sep. 14, 2018

(65) Prior Publication Data

US 2020/0088143 A1 Mar. 19, 2020

(51) Int. Cl.
| | | |
|---|---|---|
| B60K 11/00 | (2006.01) |
| F02M 35/10 | (2006.01) |
| F02M 35/16 | (2006.01) |
| B62K 11/02 | (2006.01) |
| B60K 13/02 | (2006.01) |

(52) U.S. Cl.
CPC ....... *F02M 35/10078* (2013.01); *B60K 13/02* (2013.01); *B62K 11/02* (2013.01); *F02M 35/10288* (2013.01); *F02M 35/161* (2013.01); *B60Y 2200/124* (2013.01); *B60Y 2200/20* (2013.01); *B60Y 2400/72* (2013.01)

(58) Field of Classification Search
CPC .................................................. B60K 11/00
See application file for complete search history.

(56) References Cited

U.S. PATENT DOCUMENTS

| | | | |
|---|---|---|---|
| 8,613,336 B2 | 12/2013 | Deckard et al. | |
| 2002/0134598 A1* | 9/2002 | Nakamura | B60K 11/08 180/68.1 |
| 2003/0066696 A1* | 4/2003 | Nakamura | B62K 5/01 180/68.1 |
| 2005/0166632 A1* | 8/2005 | Bureau | F28D 1/05366 62/515 |
| 2006/0011401 A1* | 1/2006 | Nakamura | B62K 5/01 180/309 |
| 2008/0289892 A1* | 11/2008 | Kusaka | B62K 5/01 180/68.3 |
| 2017/0015383 A1* | 1/2017 | Okaniwa | B62L 3/02 |
| 2017/0276234 A1* | 9/2017 | Kuji | F16H 57/0416 |
| 2018/0320777 A1* | 11/2018 | Becka | B60K 17/043 |

* cited by examiner

*Primary Examiner* — John D Walters
*Assistant Examiner* — James J Triggs
(74) *Attorney, Agent, or Firm* — Alleman Hall Creasman & Tuttle LLP

(57) ABSTRACT

A side-by-side vehicle includes a vehicle body frame including a cabin frame part surrounding a riding space; a driving power unit which is supported by the vehicle body frame and generates driving power for allowing the vehicle to travel; a continuously variable transmission (CVT) to which the driving power is transmitted from the driving power unit, in a state in which the CVT is supported by the vehicle body frame; an air-intake unit including in an inside thereof, an air-intake passage through which intake-air flows to the CVT, and an air inlet through which the intake-air is introduced into the air-intake passage; and a cargo carrier having a depressed loading space in a state in which the cargo carrier is supported by the vehicle body frame, wherein the air inlet of the air-intake unit is directed downward and faces a surface of the cargo carrier.

10 Claims, 9 Drawing Sheets

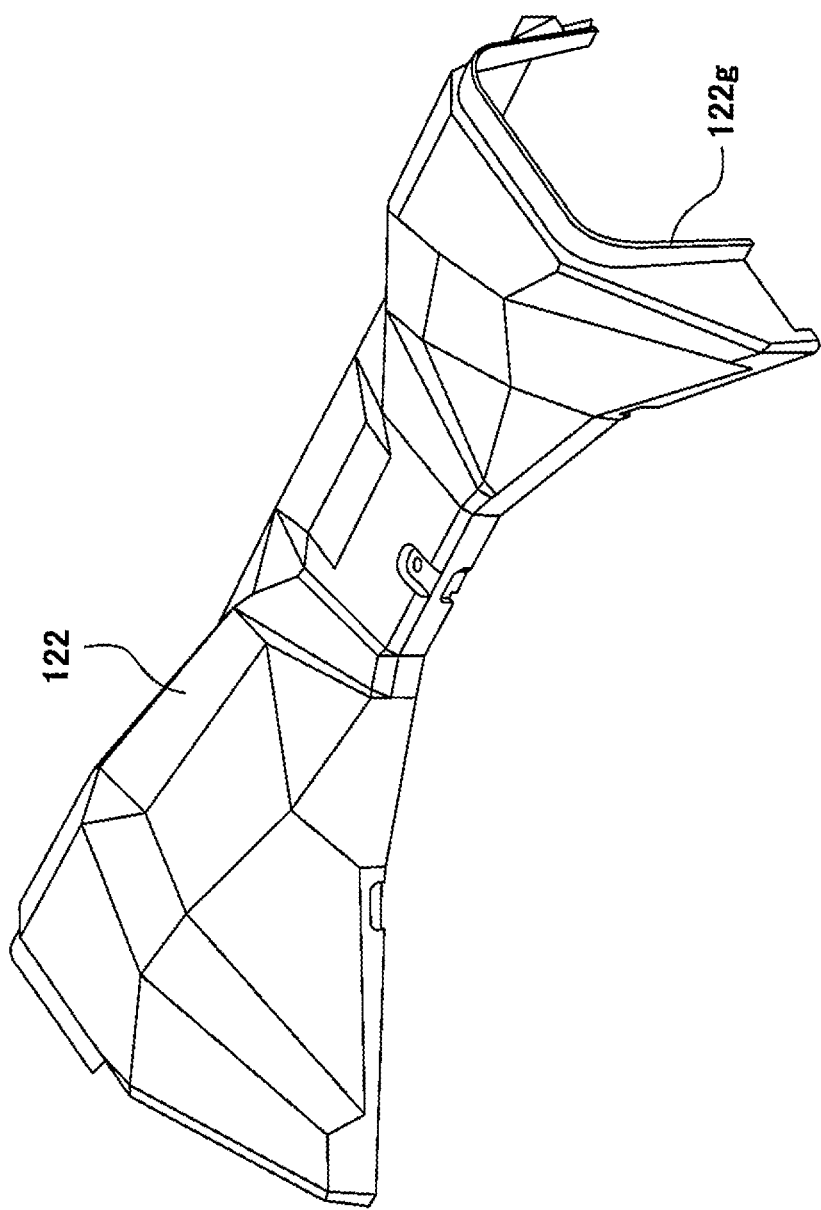

SIDE-BY-SIDE VEHICLE

BACKGROUND OF THE INVENTION

Field of the Invention

The present invention relates to a side-by-side vehicle including an air-intake structure for flowing air (intake-air) taken in from outside to a continuously variable transmission (CVT) to cool the CVT with the intake-air.

Description of the Related Art

For example, U.S. Pat. No. 8,613,336 discloses a side-by-side vehicle of a four-wheel-drive type which is able to travel off-road. This vehicle includes a continuously variable transmission (CVT) to which driving power for allowing the vehicle to travel is transmitted from a driving power unit, and an air-intake structure for flowing air (intake air) taken in from outside to the CVT to cool the CVT with the intake-air. This air-intake structure includes, for example, an air-intake passage, and an air inlet disposed at the outer side surface of a vehicle body to introduce the intake-air into the air-intake passage therethrough.

In the side-by-side vehicle including the above-described air-intake structure, there is a possibility that foreign matters such as mud, water, or sand enter the air-intake passage through the air inlet and reach the CVT or the like, while the vehicle is traveling off-road (e.g., vehicle is traveling on an unpaved road).

SUMMARY OF THE INVENTION

In view of the above-described circumstances, an object of the present invention is to prevent ingress of foreign matters into an air-intake passage through an air inlet, in a side-by-side vehicle including an air-intake structure for flowing air (intake air) taken in from outside to a continuously variable transmission (CVT) to cool the CVT with the intake-air.

According to an aspect of the present invention, a side-by-side vehicle comprises: a vehicle body frame including a cabin frame part surrounding a riding space in which seats for a driver and a passenger are provided; a driving power unit which is supported by the vehicle body frame and generates driving power for allowing the side-by-side vehicle to travel; a continuously variable transmission (CVT) to which the driving power is transmitted from the driving power unit, in a state in which the continuously variable transmission is supported by the vehicle body frame; an air-intake unit including in an inside thereof, an air-intake passage through which intake-air (air taken in from outside) flows to the continuously variable transmission, and an air inlet through which the intake-air is introduced into the air-intake passage; and a cargo carrier having a loading space with a depressed shape in a state in which the cargo carrier is supported by the vehicle body frame, wherein the air-intake unit is disposed so that the air inlet is directed downward and faces a surface of the cargo carrier.

In accordance with this configuration, since the air inlet through which the intake-air is introduced into the air-intake passage of the air-intake unit is disposed to face the surface of the cargo carrier, the air inlet is protected by the surface of the cargo carrier. Therefore, even in a case where the vehicle is traveling off road (e.g., vehicle is traveling on an unpaved road), ingress of foreign matters into the air-intake passage through the air inlet can be effectively prevented.

The above and further objects, features and advantages of the present invention will more fully be apparent from the following detailed description of preferred embodiment with reference to the accompanying drawings.

BRIEF DESCRIPTION OF THE DRAWINGS

FIG. 10 is a perspective view showing a front carrier part included in the vehicle of FIG. 7.

DETAILED DESCRIPTION OF THE PREFERRED EMBODIMENTS

Hereinafter, the embodiments of the present invention will be described with reference to the drawings. The stated directions are from the perspective of a driver or passenger riding in a side-by-side vehicle 1 (hereinafter will be simply referred to as a vehicle 1).

Embodiment 1

Figure 1:
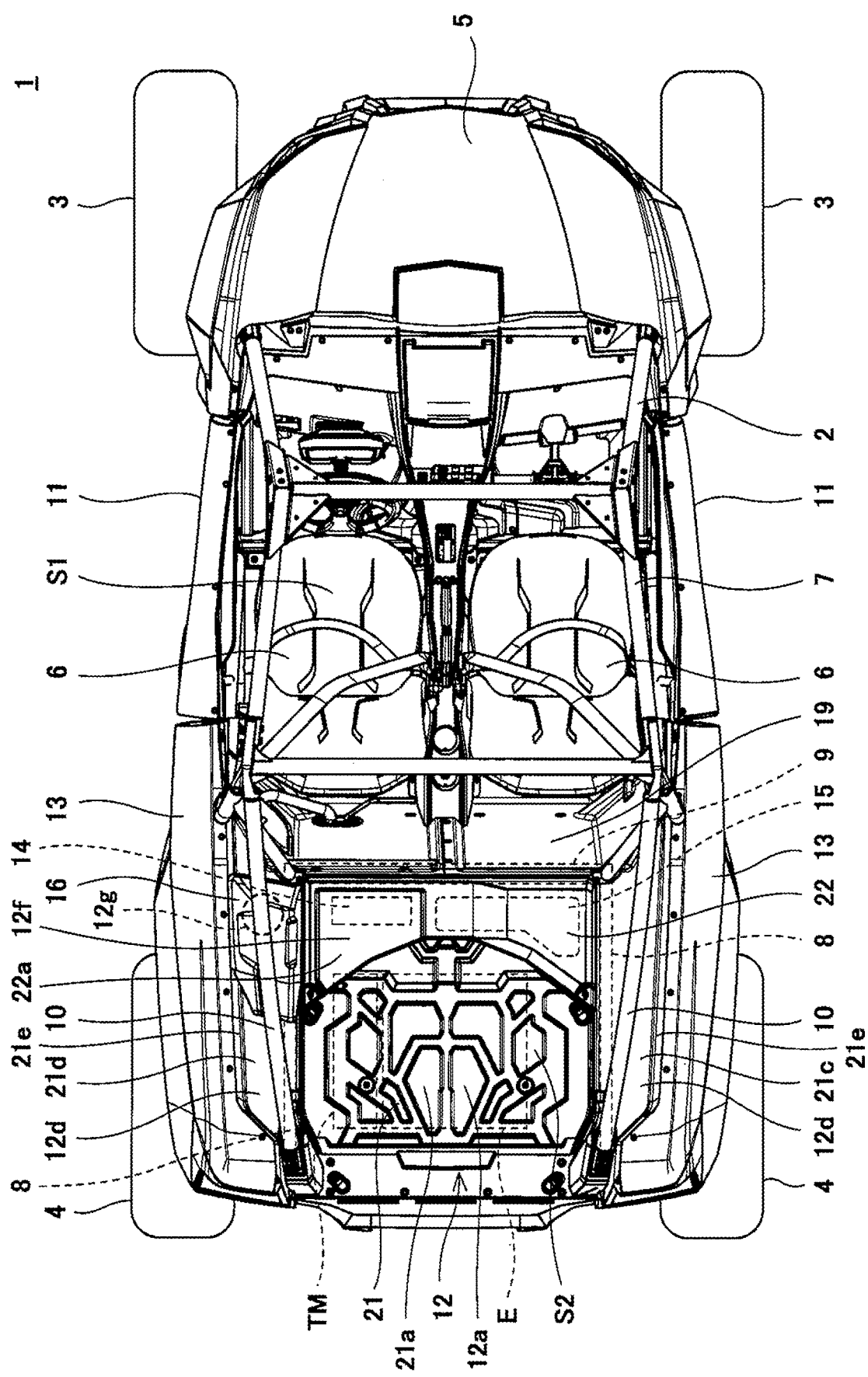
FIG. 1 is a top plan view showing a side-by-side vehicle (vehicle) according to Embodiment 1, when viewed from above.
Figure 2:
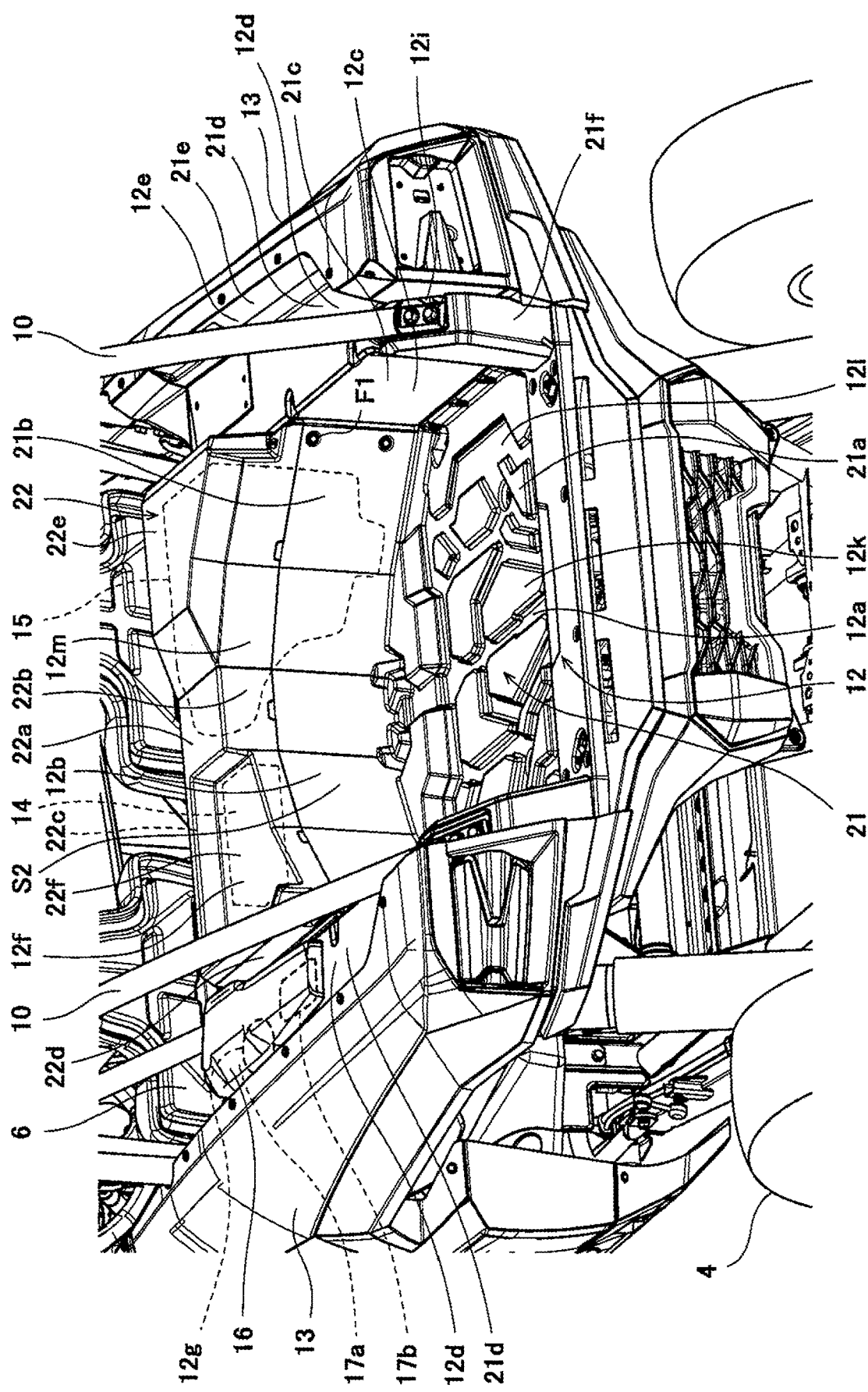
FIG. 2 is a perspective view showing a cargo carrier of FIG. 1.

FIG. 1 is a top plan view showing the vehicle 1 according to Embodiment 1, when viewed from above. FIG. 2 is a perspective view showing a cargo carrier 12 of FIG. 1.

Referring to FIGS. 1 and 2, the vehicle 1 includes a pair of right and left front wheels 3 supported by (mounted on) the front portion of a vehicle body frame 2, a pair of right and left rear wheels 4 supported by the rear portion of the vehicle body frame 2, an engine (driving power unit) E which generates driving power for allowing the vehicle 1 to travel, a continuously variable transmission (CVT) TM connected to the engine E, the cargo carrier 12, an air cleaner box 15, and an air-intake unit 16.

A space formed between the right and left front wheels 3 is covered by a hood 5 from above. A pair of seats 6 (a driver seat and a passenger seat) are arranged side by side, at a location that is rearward of the hood 5, and is in the vicinity of the center of the vehicle body frame 2 in a forward and rearward direction. The engine E is disposed rearward of the seats 6 and supported by (mounted on) the vehicle body frame 2. The CVT TM is disposed at a location that is adjacent to the engine E. The CVT TM is supported by the vehicle body frame 2 with the engine E placed between the CVT TM and the vehicle body frame 2.

The vehicle body frame 2 includes, for example, a cabin frame part 7, a pair of right and left rear frame parts 8, a cross frame part 9, and a pair of right and left rear gusset frame parts 10. The vehicle body frame 2 is a pipe frame including a plurality of pipe members which are coupled to each other. The cabin frame part 7 is disposed to surround a riding space S1 in which the seats 6 are provided. The pair of right and left rear frame parts 8 are disposed on both sides (right and left sides), respectively, in a vehicle width direction at a location that is rearward of the cabin frame part 7, and extend rearward.

The cross frame part 9 is disposed rearward of the cabin frame part 7 and connects the front end portions of the pair of right and left rear frame parts 8 to each other. The pair of right and left rear gusset frame parts 10 couple the upper portions of the cabin frame part 7 to the rear portions of the pair of right and left rear frame parts 8, respectively.

Doors 11 are disposed on both sides (right and left sides) of the seats 6, respectively, to allow the driver and the passenger to get into and out of the vehicle 1. A pair of right and left rear fenders 13 are disposed on both sides (right and left sides) in the vehicle width direction, respectively, at a location that is rearward of the seats 6 and above the rear wheels 4 in a state in which the rear fenders 13 are supported by (mounted on) the vehicle body frame 2. The front ends of the rear fenders 13 are close to and face the rear ends of the doors 11, respectively. The outer side surfaces in the vehicle width direction, of the rear fenders 13 are coplanar with the outer side surfaces in the vehicle width direction, of the doors 11, respectively.

The air-intake unit 16 includes in an inside thereof an air-intake passage 17a through which air (intake-air) taken in from outside flows to the CVT TM to cool the CVT TM with the intake-air, and an air inlet 17b through which the intake-air is introduced into the air-intake passage 17a. The air-intake unit 16 is disposed on a first side (left side in Embodiment 1) in the vehicle width direction of the vehicle 1 (the air-intake unit 16 is disposed at the cargo carrier 12 at a location that is on the first side in the vehicle width direction). The air-intake unit 16 is exposed. The air-intake unit 16 is connected to the CVT TM via an air-intake duct 31 (see FIG. 3). In Embodiment 1, the air-intake unit 16 is located outward of the CVT TM, in the vehicle width direction.

The air cleaner box 15 is configured to filter the intake-air and supply the filtered intake-air to the engine E, in a state in which the air cleaner box 15 is supported by (mounted on) the vehicle body frame 2. In the vehicle 1, the cargo carrier 12 and the air cleaner box 15 are disposed rearward of the riding space S1.

The cargo carrier 12 has a loading space S2 with a depressed (recessed) shape, which opens in an upward direction, in a state in which the cargo carrier 12 is supported by the vehicle body frame 2. The cargo carrier 12 is fastened to the vehicle body frame 2 directly or via brackets, by use of a plurality of fastening members F1 (e.g., bolts and rivets).

The cargo carrier 12 includes a main carrier part 21, and a front carrier part 22. The main carrier part 21 includes a bottom wall portion 21a, a front wall portion 21b, a pair of right and left side wall portions 21c, a pair of right and left shoulder wall portions 21d, a pair of right and left extension portions 21e, and a pair of right and left rear wall portions 21f.

The bottom wall portion 21a includes a bottom surface 12a of the loading space S2. The bottom wall portion 21a covers the engine E and the CVT TM from above. The bottom surface 12a has a concave/convex structure including a depressed region 121, and a plurality of convex (protruding) portions 12k protruding upward from the depressed region 121, and arranged apart from each other. The bottom surface 12a is formed with a drain hole (not shown) through which liquid accumulated in the bottom surface 12a is discharged from the loading space S2. Alternatively, the drain hole may be omitted.

The front wall portion 21b protrudes upward from the front end of the bottom surface 12a. When viewed from above (in a plan view), the front wall portion 21b has a shape in which it protrudes forward, as a whole. The front wall portion 21b includes a front surface 12b extending in the vehicle width direction and having a substantially circular-arc shape which protrudes forward, when viewed from above. The both ends of the front surface 12b in the vehicle width direction are connected to the front ends of the side surfaces 12c of the pair of right and left side wall portions 21c, respectively.

A battery 14 which is an electric power supply for in-vehicle devices, and the air cleaner box 15 are disposed in front of the front wall portion 21b. The battery 14 and the air cleaner box 15 are arranged side by side in the vehicle width direction. The pair of right and left side wall portions 21c have the side surfaces 12c, respectively, protruding upward from the side ends of the bottom surface 12a. In the vehicle 1, the loading space S2 is surrounded and defined by the bottom surface 12a, the front surface 12b, and the pair of right and left side surfaces 12c of the cargo carrier 12. The loading space S2 opens in an upward direction and in a rearward direction.

Each of the pair of right and left shoulder wall portions 21d includes a shoulder surface 12d protruding outward in the vehicle width direction from the upper end of the side surface 12c of corresponding one of the side wall portions 21c. The left shoulder wall portion 21d is provided with a through-hole 12g into which the air-intake duct 31 (described later) is insertable.

Each of the pair of right and left extension portions 21e includes an extension surface 12e extending from the outer side of the shoulder surface 12d in the vehicle width direction toward the upper end of corresponding one of the rear fenders 13. A part of the left extension surface 12e is depressed (recessed) outward in the vehicle width direction to avoid interference with the air-intake duct 31. The upper end of each of the extension portions 21e is connected to corresponding one of the rear fenders 13. In this structure, in the vehicle 1, the cargo carrier 12 is connected to the pair of right and left rear fenders 13 in such a manner that the surface of the cargo carrier 12 is continuous with the surfaces of the rear fenders 13. Each of the right and left rear wall portions 21f is connected to the rear end of corresponding one of the side wall portions 21c and the rear end of corresponding one of the shoulder wall portions 21d.

The front carrier part 22 covers the battery 14 and the air cleaner box 15, from above. The front carrier part 22 includes an upper wall portion 22a, a rear wall portion 22b, a front wall portion 22c, and a pair of right and left side wall portions 22d. When viewed from above (in a plan view), the front carrier part 22 extends in the vehicle width direction, on the front side of the main carrier part 21, from a location corresponding to the left end of the bottom wall portion 21a to a location corresponding to the right end of the bottom wall portion 21a.

The upper wall portion 22a of the front carrier part 22 includes an upper surface 12f disposed above the air cleaner box 15 at a location that is higher than the bottom surface 12a. The upper end of the air cleaner box 15 is higher than the upper end of the battery 14. In this structure, the upper wall portion 22a has a shape in which a region (right section 22e) of the upper wall portion 22a which is right (just) above the air cleaner box 15 is higher than a region (left section 22f) of the upper wall portion 22a which is right (just) above the battery 14.

The rear wall portion 22b of the front carrier part 22 protrudes downward from the rear end of the upper wall portion 22a. When viewed from above (in a plan view), the rear wall portion 22b has a shape in which it protrudes forward, as a whole. More specifically, the rear wall portion 22b includes a front surface 12m extending in the vehicle width direction and having a substantially circular-arc shape in which the front surface 22m protrudes forward when viewed from above. The lower end of the front surface 12m is connected to the upper end of the front surface 12b of the front wall portion 21b. In this structure, the rear wall portion 22b of the front carrier part 22 and the front wall portion 21b of the main carrier part 21 define the front surface of the loading space S2.

The front wall portion 22c of the front carrier part 22 protrudes downward from the front end of the upper wall portion 22a. The pair of right and left side wall portions 22d protrude downward from the right end and left end, respectively, of the upper wall portion 22a, and are connected to the rear wall portion 22b and the front wall portion 22c.

Each of the pair of right and left shoulder wall portions 21d extends in the forward and rearward direction from a location corresponding to the front end of the front carrier part 22 to a location corresponding to the rear end of the cargo carrier 12. In this configuration, the shoulder surface 12d extends through a gap formed between the surface of the left side wall portion 22d of the front carrier part 22 and the left extension surface 12e of the main carrier part 21, and the air-intake unit 16 is disposed to overlap with the shoulder surface 12d in this gap.

The cargo carrier 12 is fastened to the pair of right and left rear frame parts 8 in a state in which the cargo carrier 12 covers the rear frame parts 8 from above. Openings 12i are formed on both sides in the vehicle width direction, of the rear portion of the cargo carrier 12, to expose the rear portions of the rear frame parts 8, respectively. The rear portions of the pair of rear gusset frame parts 10 are fastened to the rear portions of the pair of right and left rear frame parts 8, via the openings 12i, respectively, of the cargo carrier 12.

Figure 3:
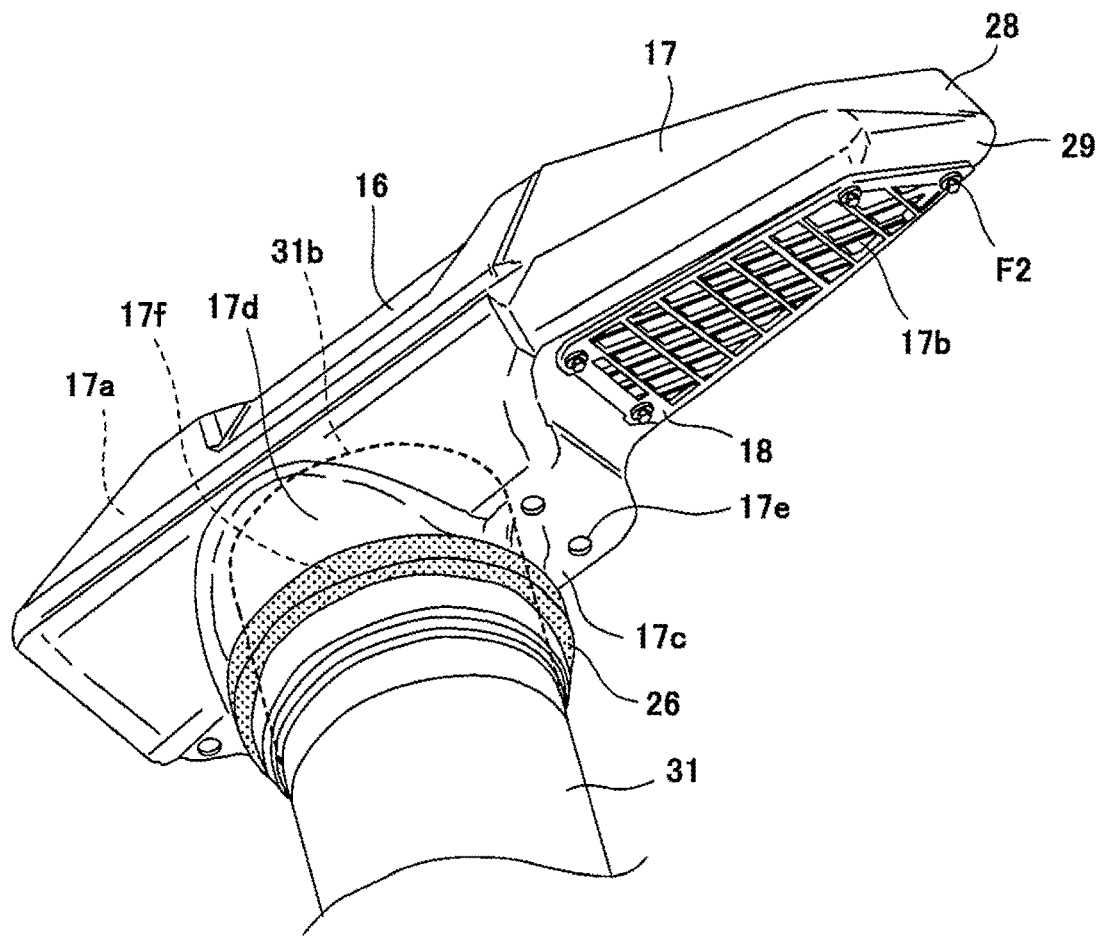
FIG. 3 is a perspective view showing an air-intake unit of FIG. 1.

FIG. 3 is a perspective view of the air-intake unit 16 of FIG. 1. As shown in FIG. 3, the air-intake unit 16 includes a hollow member 17, and a first filter member 18 (filter member of the air-intake unit 16). The hollow member 17 includes a first case 28 and a second case 29 which are vertically joined to each other. The first case 28 is located on an upper side, while the second case 29 is located on a lower side.

For example, the hollow member 17 has an elongated shape in which a maximum (largest) thickness (height) is smaller than a maximum (largest) width, and is disposed in such a manner that its lengthwise direction corresponds with the forward and rearward direction. For example, a highest position of the upper surface of the hollow member 17 is lower than a highest position of the cargo carrier 12.

The air inlet 17b of the air-intake unit 16 is directed downward and faces the surface (the left shoulder surface 12d in Embodiment 1) of the cargo carrier 12. The air inlet 17b is provided at the lower side of the rear portion of the hollow member 17. The air inlet 17b is covered by the first filter member 18. The first filter member 18 is formed of, for example, a mesh member. The first filter member 18 is removably fastened to a peripheral region of the air inlet 17b of the hollow member 17 by fastening members F2 (e.g., rivets).

A protruding part 17c and a tubular connection part 17d are provided at the lower side of the front portion of the hollow member 17. The protruding part 17c protrudes downward more than the peripheral region of the air inlet 17b. The connection part 17d protrudes downward from the lower surface of the protruding part 17c. The lower surface of the protruding part 17c is in contact with the shoulder surface 12d of the cargo carrier 12. The lower surface of the protruding part 17c is formed with a plurality of insertion holes 17e.

The inner space of the connection part 17d is in communication with the air-intake passage 17a. The connection part 17d is disposed in front of the air inlet 17b. The connection part 17d is removably connected to an upstream end portion 31b of the air-intake duct 31 via the through-hole 12g formed in the shoulder surface 12d of the cargo carrier 12. In Embodiment 1, a downstream end portion 17f of the connection part 17d is located below the upstream end portion 31b of the air-intake duct 31, and the upstream end portion 31b of the air-intake duct 31 is disposed inside the air-intake passage 17a in a state in which the upstream end portion 31b is inserted into the connection part 17d.

An annular elastic member 26 is provided to surround the connection part 17d. The elastic member 26 is made of, for example, a flexible porous material. The elastic member 26 is disposed between the connection part 17d and the through-hole 12g. In this structure, the air-intake duct 31 is supported by the cargo carrier 12 via the connection part 17d and the elastic member 26, in a state in which the air-intake duct 31 is inserted into the through-hole 12g. The periphery of an opening of the downstream end portion 17f of the connection part 17d is disposed inside the elastic member 26. The elastic member 26 serves to seal a clearance formed between the connection part 17d and the air-intake duct 31.

Figure 4:
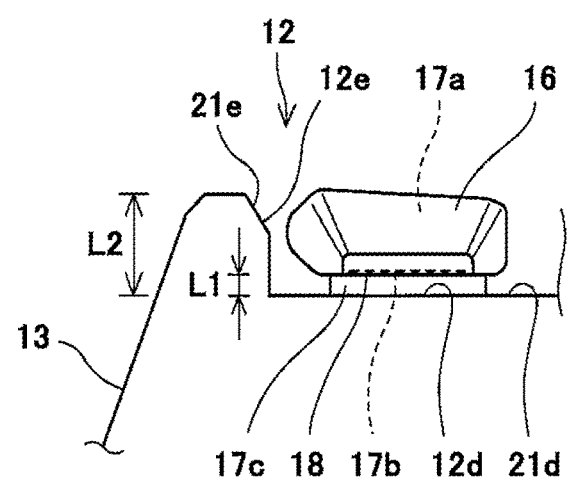
FIG. 4 is a view showing an air-intake unit and the left side portion of the cargo carrier of FIG. 1, when viewed from the rear.

FIG. 4 is a view showing the air-intake unit 16 and the left side portion of the cargo carrier 12 of FIG. 1, when viewed from the rear. FIG. 4 shows the contour of the left shoulder wall portion 21d and the contour of the left extension surface 12e, of the cargo carrier 12. As shown in FIG. 4, a minimum (shortest) distance L1 between the shoulder surface 12d of the shoulder wall portion 21d, and the air inlet 17b of the air-intake unit 16 is shorter than a minimum (shortest) distance L2 between the shoulder surface 12d of the shoulder wall portion 21d and the upper end surface of the rear fender 13. A vertical position (position in a height direction) of the air inlet 17b is lower than a vertical position (position in a height direction) of the uppermost end of the rear fender 13. In this structure, the rear fender 13 functions as a barrier to prevent a situation in which foreign matters present in an outside region of the rear fender 13 move beyond the rear fender 13 and are suctioned into the air-intake passage 17a through the air inlet 17b.

The minimum (shortest) distance L1 can be suitably set. However, preferably, the minimum distance L1 is set to a value so that the air inlet 17b of the air-intake unit 16 is positioned apart at a certain distance from the shoulder surface 12d, in order to make it difficult for the foreign matters present on the shoulder surface 12d to be suctioned into the air-intake passage 17a through the air inlet 17b. In Embodiment 1, the protruding part 17c protrudes downward more than the peripheral region of the air inlet 17b. With this shape, in a state in which the protruding part 17c is in surface contact with the shoulder surface 12d, the air inlet 17b is apart at the minimum distance L1 from the shoulder surface 12d.

The air-intake unit 16 is detachably (removably) fastened to the cargo carrier 12 by inserting fastening members (e.g., rivets) into the insertion holes 17e via an insertion hole (not shown) formed in the shoulder surface 12d of the cargo carrier 12, from the underside of the cargo carrier 12. During maintenance or the like of the air-intake unit 16, the air-intake unit 16 can be easily detached (removed) from the shoulder wall portion 21d by removing the fastening members from the insertion holes 17e. Also, the air-intake unit 16 is reversed (inverted), and the fastening members F2 are removed from the peripheral region of the air inlet 17b. In this way, the first filter member 18 can be easily detached (dismounted) from the hollow member 17.

Although the lower region of the hollow member 17 including the periphery of the air inlet 17b is parallel to the shoulder surface 12d, for example, the lower region of the hollow member 17 may be inclined with respect to the shoulder surface 12d. As the first filter member 18, a mesh sheet may be used. Further, a filter member different from the first filter member 18 may be disposed inside the air-intake passage 17a.

Figure 5:
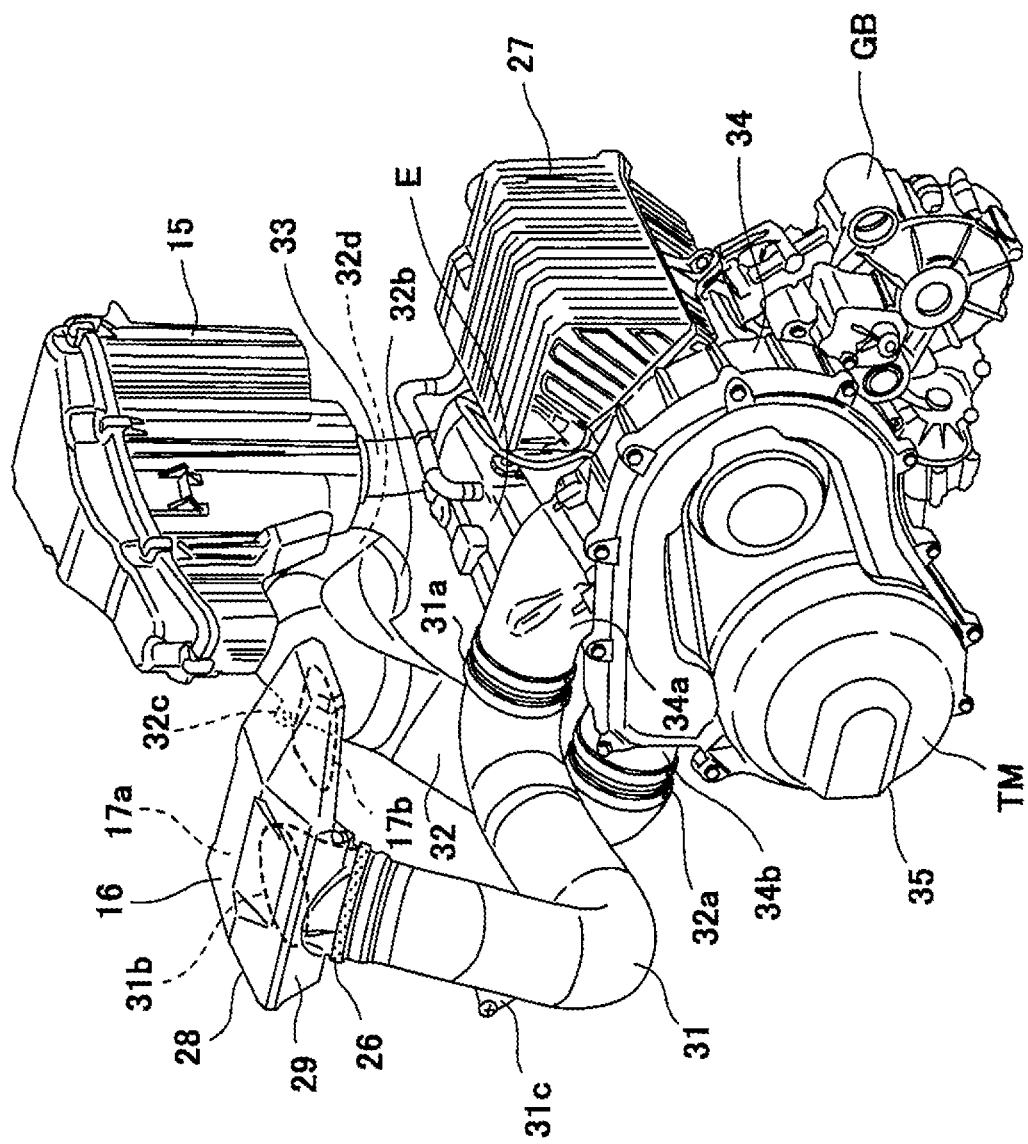
FIG. 5 is a perspective view showing an air cleaner box, the air-intake unit, and a continuously variable transmission (CVT) of FIG. 1.

FIG. 5 is a perspective view showing the air cleaner box 15, the air-intake unit 16, and the continuously variable transmission (CVT) TM of FIG. 1. As shown in FIG. 5, a gear box GB is disposed rearward of the engine E. An output of the CVT TM is transmitted to the gear box GB. The gear box GB extends in the forward and rearward direction and in a substantially vertical direction. An air-intake chamber 27 is disposed above the gear box GB. The air flows through the air cleaner box 15 and is supplied to the air-intake chamber 27 through a supply pipe 33. Then, the intake-air is supplied from the air-intake chamber 27 to the engine E.

Figure 6:
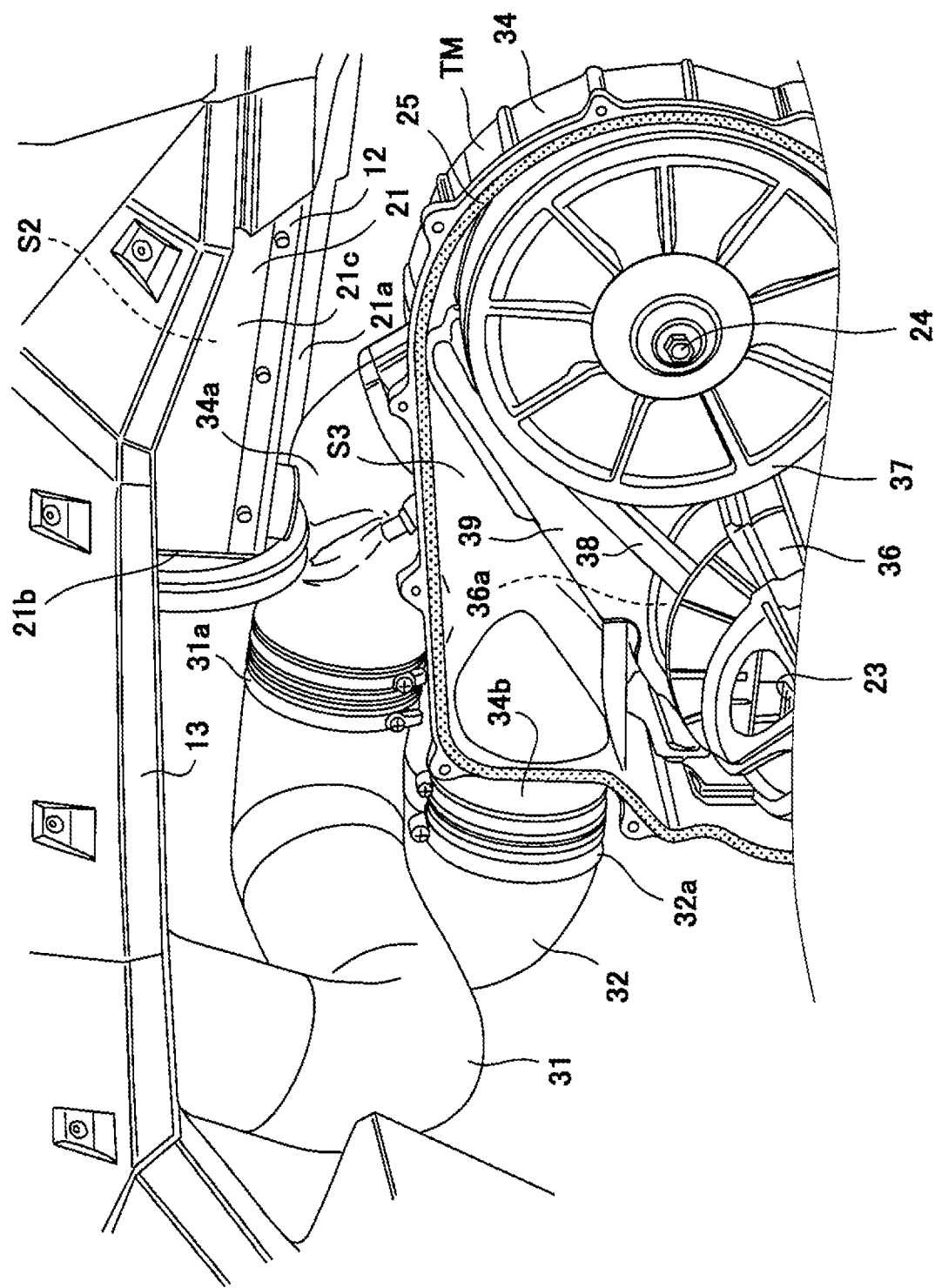
FIG. 6 is a perspective view showing a state in which a transmission cover of the CVT of FIG. 5 is detached.

FIG. 6 is a perspective view showing a state in which a transmission cover 35 of the CVT TM of FIG. 5 is detached. As shown in FIGS. 5 and 6, the CVT TM is disposed below the cargo carrier 12. The vehicle 1 further includes the air-intake duct 31 and an air discharge duct 32. The air-intake duct 31 is connected to the CVT TM and the air-intake unit 16, and is disposed to guide the intake-air flowing from the air-intake passage 17a (the intake-air which has flowed through the air-intake passage 17a) of the air-intake unit 16 to an inner space S3 of the CVT TM.

The air-intake duct 31 includes a downstream end portion 31a, an upstream end portion 31b, and a support portion 31c. The downstream end portion 31a is removably connected to an air-intake duct connection part 34a of the CVT TM. The upstream end portion 31b is removably connected to the air-intake unit 16 at a location that is above the downstream end portion 31a. The support portion 31c is a bracket provided at an intermediate portion of the air-intake duct 31. The support portion 31c is coupled to a back panel 19 (see FIG. 1) by a fastening member. The back panel 19 defines the width of a rearward region within the vehicle 1. In this way, the air-intake duct 31 is supported by the back panel 19.

For example, the air-intake duct 31 extends from the CVT TM to a location that is forward of the loading space S2, and then extends in the vehicle width direction of the cargo carrier 12. In Embodiment 1, more specifically, the air-intake duct 31 extends from the CVT TM to a location that is forward of the loading space S2, then extends to the left, and then extends upward such that the air-intake duct 31 is inclined in a rearward direction. The air-intake duct 31 is removably mounted on the CVT TM and the air-intake unit 16 at a location that is rearward of the riding space S1.

The air discharge duct 32 is connected to the CVT TM and disposed to guide the intake-air discharged from the CVT TM to an outside region of the CVT TM. The air discharge duct 32 includes an upstream end portion 32a, a downstream end portion 32b, and a support portion 32c. The upstream end portion 32a is removably connected to an air discharge duct connection part 34b of the CVT TM. The downstream end portion 32b is located above the upstream end portion 32a. The support portion 32c is a bracket provided at an intermediate portion of the air discharge duct 32. The support portion 32c is coupled to the vehicle body frame 2 by a fastening member. In this way, the air discharge duct 32 is supported by the vehicle body frame 2.

For example, the air discharge duct 32 extends from the CVT TM to a location that is forward of the loading space S2, and then extends in the vehicle width direction of the cargo carrier 12. The air discharge duct 32 and the air cleaner box 15 are disposed to overlap with each other in the vertical direction. In Embodiment 1, more specifically, the air discharge duct 32 extends from the CVT TM to a location that is forward of the loading space S2, and then extends to the right. An air discharge port 32d provided at the downstream end portion 32b opens in an obliquely downward direction, on the right side of the vehicle 1. The air discharge duct 32 is removably (detachably) mounted on the CVT TM at a location that is rearward of the riding space S1.

As shown in FIGS. 5 and 6, the CVT TM includes a transmission case 34, the transmission cover 35, a drive pulley 36, a driven pulley 37, a CVT belt 38, and an inner cover 39. The transmission case 34 extends in the forward and rearward direction and in the substantially vertical direction. The transmission case 34 includes the air-intake duct connection part 34a and the air discharge duct connection part 34b. The transmission case 34 is disposed to open outward in the vehicle width direction (leftward in Embodiment 1). The air-intake duct connection part 34a is in communication with the inner space S3 of the CVT TM at a location that is rearward of the air discharge duct connection part 34b. The air-intake duct connection part 34a and the air discharge duct connection part 34b have a tubular shape and extend in the forward and rearward direction.

In the inner space S3 of the transmission case 34, the drive pulley 36 is disposed on the front side of the transmission case 34 and is rotatable around the axis of an input shaft 23 to which the driving power of the engine E is transmitted. The input shaft 23 extends in the vehicle width direction and is connected to the engine E. A plurality of fins 36a are provided at an outer surface of the drive pulley 36, the outer surface being opposite to a surface of the drive pulley 36, at which the CVT belt 38 is located. The plurality of fins 36a are arranged in the circumferential direction of the drive pulley 36, and extend in the vehicle width direction, and in the radial direction from the center of rotation of the drive pulley 36.

The driven pulley 37 is disposed on the rear side of the transmission case 34 and is rotatable around the axis of an output shaft 24 of the CVT TM. The output shaft 24 extends in the vehicle width direction and is connected to the gear box GB. The CVT belt 38 is provided around the drive pulley 36 and the driven pulley 37 to be capable of transmitting the driving power from the drive pulley 36 to the driven pulley 37.

The inner cover 39 extends in the forward and rearward direction and in the substantially vertical direction. The inner cover 39 covers a part of the right side of the inner space S3. The transmission cover 35 is joined to the transmission case 34 in such a manner that the transmission cover 35 covers the inner space S3 from an outer side (left side in Embodiment 1) of the transmission case 34 in the vehicle width direction.

Specifically, the transmission cover 35 is joined to the transmission case 34 in a state in which a seal member 25 is placed at the periphery of an opening of the transmission case 34, and fastened to the transmission case 34 by use of fastening members. In this configuration, during maintenance or the like for the CVT TM, a user can easily access the interior part of the CVT TM, for example, by detaching the transmission cover 35 from the transmission case 34, from the left side and outer side of the vehicle 1.

In the CVT TM, the rotational driving power of the engine E is transmitted from the drive pulley 36 to the driven pulley 37 through the CVT belt 38. At this time, the plurality of fins 36a rotate around the axis of the input shaft 23, so that a negative pressure is generated in the inner space S3 of the CVT TM. Thereby, the intake-air is introduced into the air-intake passage 17a through the air inlet 17b of the air-intake unit 16 and flows through the inside of the air-intake duct 31. After the intake-air has flowed through the air-intake duct 31, the intake-air is introduced into the inner space S3 from a location that is rightward of the inner cover 39. Then, the intake-air flows through a region around the drive pulley 36 and a region around the driven pulley 37.

By the above-described air flow, the CVT TM is cooled. This makes it possible to prevent a situation in which the temperature of the CVT TM is excessively increased due to heat generated by friction between the CVT belt 38 and the pulleys 36, 37. After the intake-air has cooled the CVT TM, the intake-air is discharged from a location that is leftward of the inner cover 39 to the air discharge duct 32. The intake-air flows through the air discharge duct 32. After that, the intake-air is discharged from the air discharge port 32d.

As described above, in accordance with the vehicle 1, the air inlet 17b through which the intake-air is introduced into the air-intake passage 17a of the air-intake unit 16 is disposed to face the surface of the cargo carrier 12. In this layout, the air inlet 17b is protected by the surface of the cargo carrier 12. Therefore, for example, while the vehicle 1 is traveling off-road, ingress of the foreign matters into the air-intake passage 17a through the air inlet 17b can be effectively prevented. Since the air inlet 17b is directed downward, it becomes possible to prevent a situation in which rain water or muddy water falling from above the air-intake unit 16 flows into the air-intake passage 17a through the air inlet 17b.

Since the air inlet 17b is located below the upper end of the rear fender 13, it becomes possible to effectively prevent a situation in which foreign matters such as sand or mud whirled by the rear wheel 4 or the like, from below the rear fender 13 enter the air-intake passage 17a through the air inlet 17b, while the vehicle 1 is traveling.

Since the air-intake unit 16 is disposed at the cargo carrier 12 at a location that is on the first side in the vehicle width direction, ingress of foreign matters into the air-intake passage 17a through the air inlet 17b can be prevented while avoiding a situation in which the air-intake unit 16 interferes with stuff (e.g., spare tire) being loaded into the loading space S2.

The cargo carrier 12 includes the bottom surface 12a, the side surfaces 12c, and the shoulder surfaces 12d, and the air-inlet 17b faces the left shoulder surface 12d from above. In this configuration, since the air-inlet 17b faces the shoulder surface 12d of the cargo carrier 12 from above, ingress of foreign matters into the air-intake passage 17a through the air inlet 17b can be prevented while allowing the stuff to be properly loaded into the loading space S2.

Each of the shoulder surfaces 12d of the cargo carrier 12 is disposed below the upper end of the corresponding one of the rear fenders 13, and the cargo carrier 12 is connected to the rear fenders 13 in such a manner that the surface of the cargo carrier 12 is continuous with the surfaces of the rear fenders 13. In this configuration, it becomes possible to effectively prevent a situation in which foreign matters such as sand or mud whirled by the rear wheel 4 or the like, from below the rear fender 13 enter the air-intake passage 17a through the air inlet 17b of the air-intake unit 16 disposed to face the shoulder surface 12d of the cargo carrier 12, while the vehicle 1 is traveling.

The CVT TM is disposed below the cargo carrier 12, and the air-intake duct 31 extends from the CVT TM to a location that is forward of the loading space S2 and then extends in the vehicle width direction of the cargo carrier 12. In this layout, the CVT TM and the air-intake duct 31 can be efficiently disposed in a space below the cargo carrier 12, while preventing ingress of the foreign matters into the air-intake passage 17a through the air-inlet 17b. In addition, the air-intake duct 31 can be extended while preventing the CVT TM and the air-intake duct 31 from interfering with the cargo carrier 12.

The air-intake duct 31 is supported by the cargo carrier 12 via the elastic member 26 provided between the through-hole 12g and the air-intake duct 31, in a state in which the air-intake duct 31 is inserted into the through-hole 12g. In this configuration, stuff (e.g., spare tire) can be easily loaded into the loading space S2, while preventing ingress of the foreign matters into the air-intake passage 17a through the air-inlet 17b. In addition, the air-intake duct 31 can be supported by the cargo carrier 12 while suppressing a vibration of the air-intake duct 31, by the elastic member 26 provided between the through-hole 12g and the air-intake duct 31.

The air discharge duct 32 extends from the CVT TM to a location that is forward of the loading space S2 and then extends in the vehicle width direction of the cargo carrier 12. In this layout, the air discharge duct 32 can be efficiently disposed in a space below the cargo carrier 12, while preventing ingress of the foreign matters into the air-intake passage 17a through the air-inlet 17b. In addition, the air discharge duct 32 can be extended while preventing interference between the air discharge duct 32 and the cargo carrier 12.

The air-intake duct 31 is removably mounted on the CVT TM and the air-intake unit 16 at a location that is rearward of the riding space S1. In this layout, the air-intake duct 31 can be efficiently disposed in the space that is rearward of the riding space S1, while preventing ingress of the foreign matters into the air-intake passage 17a through the air-inlet 17b. In addition, the air-intake duct 31 can be taken out and maintenance for the air-intake duct 31 can be easily performed.

Since the air discharge duct 32 and the air cleaner box 15 are disposed to overlap with each other in the vertical direction, the air discharge duct 32 and the air cleaner box 15 can be efficiently disposed by achieving space saving, while preventing ingress of the foreign matters into the air-intake passage 17a through the air-inlet 17b.

The air-intake unit 16 includes the hollow member 17, and the first filter member 18 removably fastened to the hollow member 17. In this configuration, a maintenance work for the air-intake unit 16 can be efficiently performed by detaching the first filter member 18 from the hollow member 17.

In the cargo carrier 12 of the vehicle 1, the front wall portion 21*b* of the main carrier part 21 and the rear wall portion 22*b* of the front carrier part 22 have a shape in which they protrude forward as a whole. Because of this shape, the battery 14 and the air cleaner box 15 are disposed rearward of the riding space S1, the air-intake unit 16 is disposed so that the air inlet 17*b* faces the surface of the cargo carrier 12, and the stuff (e.g., spare tire) can be easily loaded in the loading space S2. Thus, high space efficiency can be achieved in the vehicle 1. Hereinbelow, regarding Embodiment 2, differences from Embodiment 1 will be mainly described.

Embodiment 2

Figure 7:
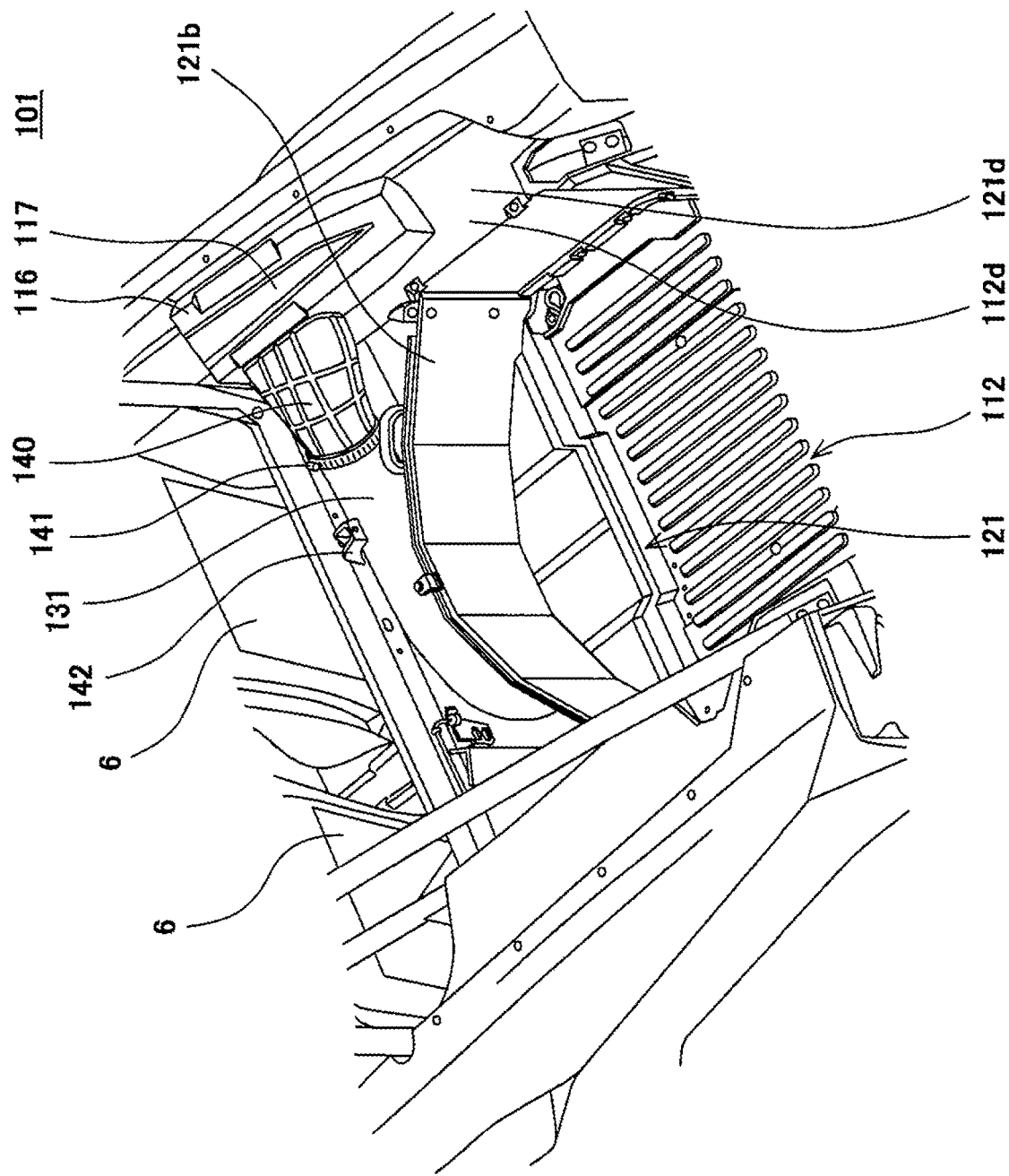
FIG. 7 is a perspective view showing the rear portion of a side-by-side vehicle (vehicle) according to Embodiment 2.
Figure 8:
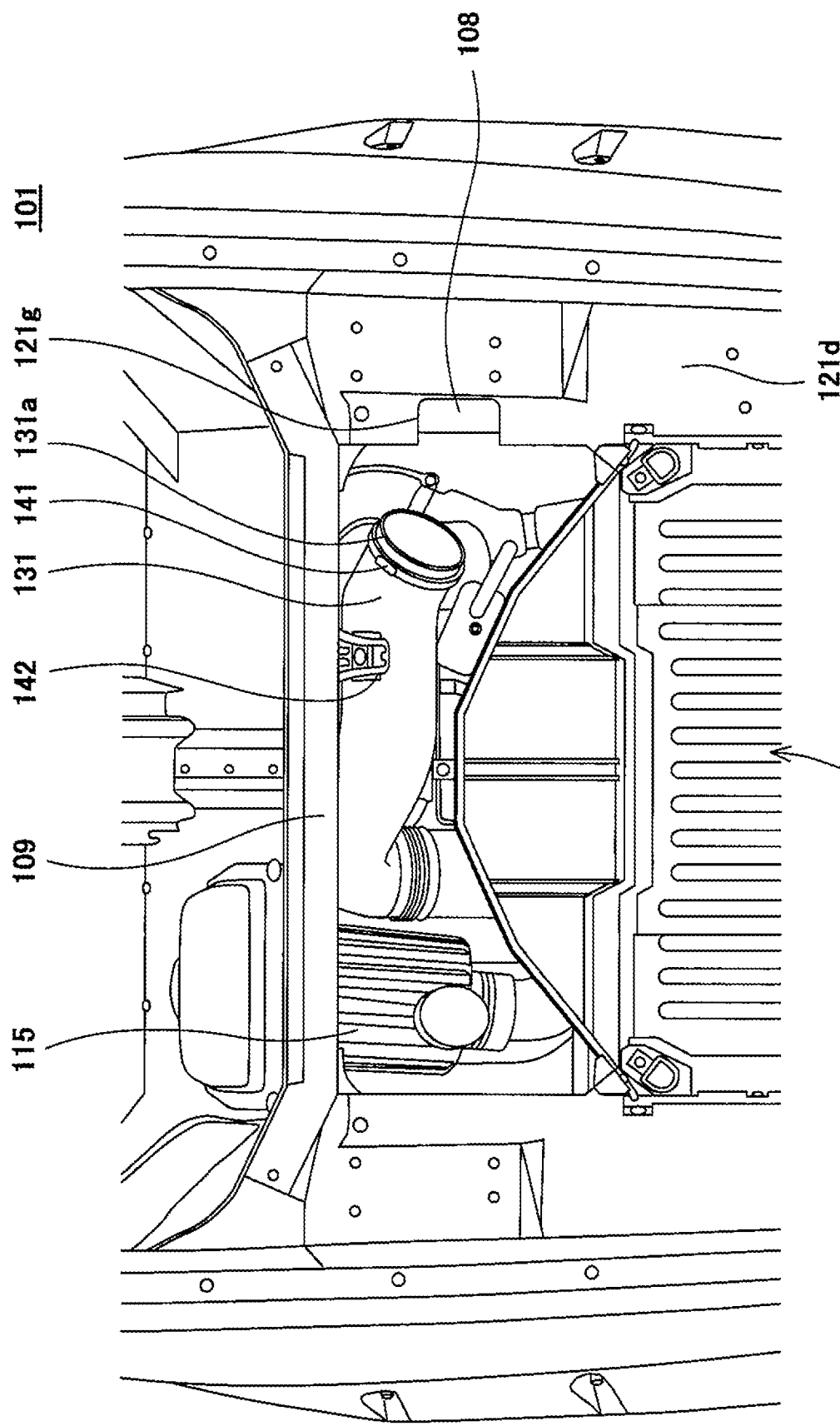
FIG. 8 is a tip plan view of the cargo carrier of FIG. 7.
Figure 9:
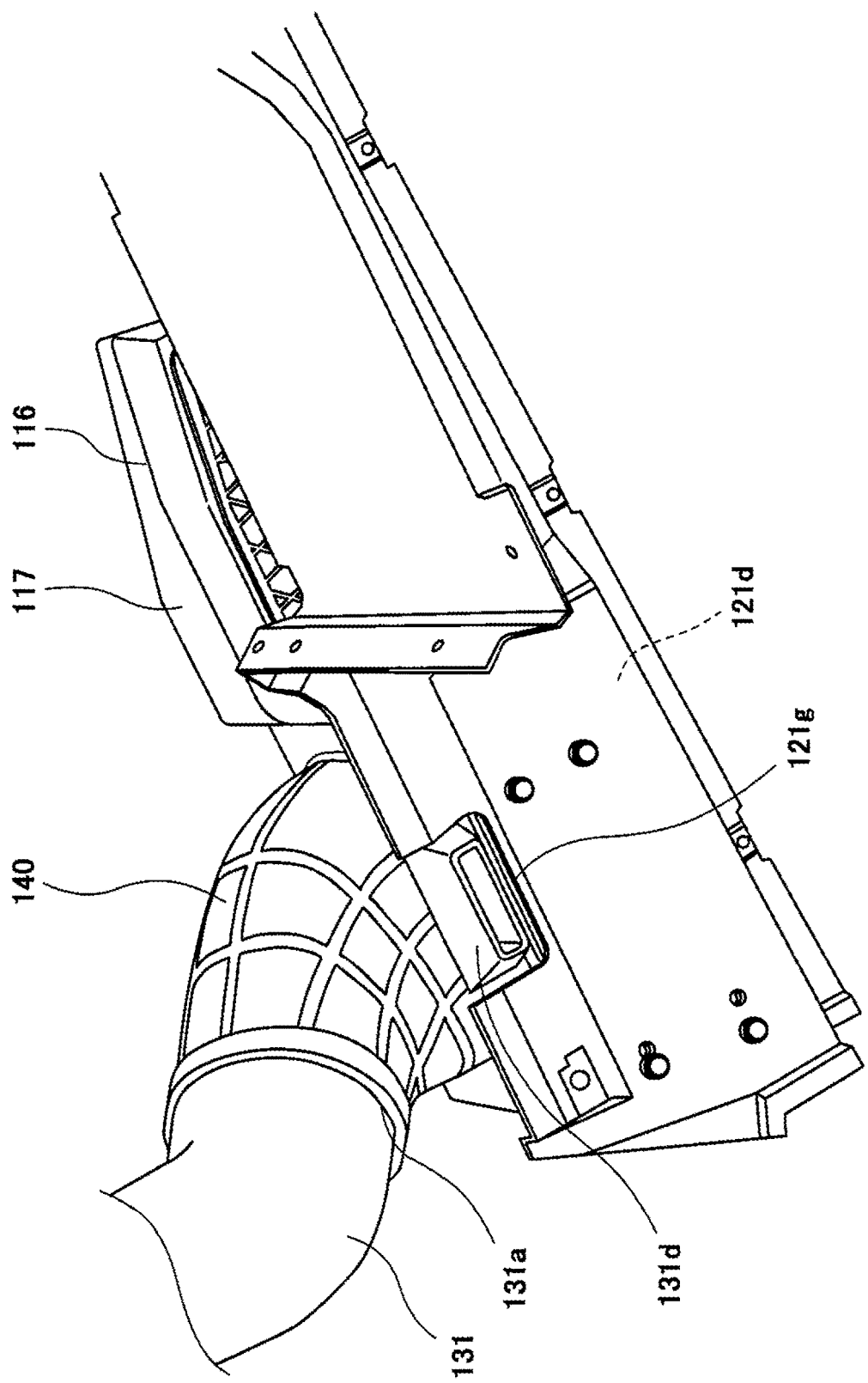
FIG. 9 is a perspective view showing a shoulder wall portion and a connection member of FIG. 7, when viewed from below.

FIG. 7 is a perspective view showing the rear portion of a side-by-side vehicle (vehicle) 101 according to Embodiment 2. FIG. 7 shows a state in which a front carrier part 122 is detached. FIG. 8 is a top plan view showing a cargo carrier 112 of FIG. 7. FIG. 8 shows a state in which the front carrier part 122 and an air-intake unit 116 are detached. FIG. 9 is a perspective view showing a shoulder wall portion 121*d* and a connection member 140 of FIG. 7, when viewed from below. FIG. 10 is a perspective view showing the front carrier part 122 included in the vehicle 101 of FIG. 7.

As shown in FIGS. 7 to 10, the air-intake unit 116 of the vehicle 101 is disposed on the right side of the vehicle 101 and is exposed. The vehicle 101 includes a tubular connection member 140 extending in the vehicle width direction and connected to a hollow member 117 of the air-intake unit 116 and an air-intake duct 131. A first end of the connection member 140 is connected to the hollow member 117 at the inner side portion in the vehicle width direction, of the hollow member 117. A second end of the connection member 140 is connected to an upstream end portion 131*a* of the air-intake duct 131. The second end of the connection member 140 is disposed to cover the upstream end portion 131*a* of the air-intake duct 131 and then secured to the upstream end portion 131*a* by a tightening clamp 141. The connection member 140 is disposed forward of the main carrier part 121 and partially overlaps with a front wall portion 121*b* of the main carrier part 121, when viewed from the forward and rearward direction.

An opening 122*g* is formed at one end in the vehicle width direction, of the front carrier part 122 of the vehicle 101. The connection member 140 is insertable into the opening 122*g*. In a state in which the front carrier part 122 is mounted on the vehicle 101, the upstream portion of the connection member 140 is exposed through the opening 122*g*. The hollow member 117 and the connection member 140 may be separately provided or integrated.

The air-intake duct 131 extends from the hollow member 117 to a location that is inward in the vehicle width direction, then extends downward, and then is connected to the CVT TM. In a state in which the lower surface of the hollow member 117 is in contact with a shoulder surface 112*d* of the shoulder wall portion 121*d*, the hollow member 117 is secured onto the shoulder wall portion 121*d* by a plurality of fastening members such as rivets.

The cargo carrier 112 of the vehicle 101 is not formed with a through-hole corresponding to the through-hole 12*g*. In the vehicle 101, a protruding portion 131*d* protruding downward is provided at a location that is in the vicinity of the upstream end portion 131*a* of the air-intake duct 131. The shoulder wall portion 121*d* is provided with a hollow space 121*g* at a location corresponding to the protruding portion 131*d*. The air-intake duct 131 is disposed so that the protruding portion 131*d* is located within the hollow space 121*g*.

The tip end in a protruding direction, of the protruding portion 131*d*, contacts the rear frame part 108, and thus the air-intake duct 131 is supported by the rear frame part 108. The side portion of the air-intake duct 131 is fastened to a cross frame part 109 by a bracket 142 and a fastening member, and thus the air-intake duct 131 is supported by the cross frame part 109. The side portion of the air discharge duct 32 is fastened to the cross frame part 109 by a bracket and a fastening member, and thus the air-discharge duct 32 is supported by the cross frame part 109, although this not shown.

In the vehicle 101, the battery 14 is disposed under the seat 6, and the air cleaner box 115 is disposed under the cross frame part 109 at a location that is on the second side (left side in Embodiment 2) in the vehicle width direction. By detaching (dismounting) the front carrier part 122, the air-intake duct 131 is exposed.

In Embodiment 2, the same advantages as those of Embodiment 1 can be obtained. In addition, the air-intake unit 116 and the air-intake duct 131 can be stably disposed, because the air-intake unit 116 is secured to and supported by the cargo carrier 112 in a state in which the air-intake duct 131 is supported by the vehicle body frame (rear frame part 108).

Numerous modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention.

For example, although the air-intake unit 16, 116 is disposed to face the shoulder surface 12*d* of the cargo carrier 12, 112, the air-intake unit 16, 116 may be disposed to face the bottom surface 12*a*, 112*a* of the cargo carrier 12, 112. Although the engine E is mounted in the vehicle 1, 101, the driving power unit is not limited, and may be an electric motor instead of the engine E.

The invention claimed is:

1. A side-by-side vehicle comprising:
   a vehicle body frame including a cabin frame part surrounding a riding space in which seats for a driver and a passenger are provided;
   a driving power unit which is supported by the vehicle body frame and generates driving power for allowing the side-by-side vehicle to travel;
   a continuously variable transmission to which the driving power is transmitted from the driving power unit, in a state in which the continuously variable transmission is supported by the vehicle body frame;
   an air-intake unit including in an inside thereof, an air-intake passage through which intake-air flows to the continuously variable transmission, and an air inlet through which the intake-air is introduced into the air-intake passage; and
   a cargo carrier having a loading space with a depressed shape in a state in which the cargo carrier is supported by the vehicle body frame,
   wherein the air-intake unit is disposed so that the air inlet is directed downward and faces a surface of the cargo carrier.

2. The side-by-side vehicle according to claim 1, further comprising:
a rear wheel; and
a rear fender disposed above the rear wheel in a state in which the rear fender is supported by the vehicle body frame,
wherein the air inlet of the air-intake unit is disposed below an upper end of the rear fender.

3. The side-by-side vehicle according to claim 1,
wherein the air-intake unit is disposed at the cargo carrier at a location that is on a first side in a vehicle width direction.

4. The side-by-side vehicle according to claim 1,
wherein the cargo carrier includes a bottom surface of the loading space, a side surface protruding upward from a side end of the bottom surface, and a shoulder surface protruding outward in a vehicle width direction, from an upper end of the side surface, and
wherein the air inlet faces the shoulder surface from above.

5. The side-by-side vehicle according to claim 4, further comprising:
a rear wheel; and
a rear fender disposed above the rear wheel in a state in which the rear fender is supported by the vehicle body frame,
wherein the shoulder surface is disposed below an upper end of the rear fender,
wherein the cargo carrier further includes an extension surface extending from an outer side of the shoulder surface in the vehicle width direction toward the upper end of the rear fender, and
wherein the cargo carrier is connected to the rear fender so that the surface of the cargo carrier is continuous with a surface of the rear fender.

6. The side-by-side vehicle according to claim 1, further comprising:
an air-intake duct which is connected to the continuously variable transmission and the air-intake unit, and guides the intake-air flowing from the air-intake passage of the air-intake unit to an inside part of the continuously variable transmission,
wherein the continuously variable transmission is disposed below the cargo carrier, and the air-intake duct extends from the continuously variable transmission to a location that is forward of the loading space, and then extends in a vehicle width direction of the cargo carrier.

7. The side-by-side vehicle according to claim 6,
wherein the air-intake unit is secured to and supported by the cargo carrier, in a state in which the air-intake duct is supported by the vehicle body frame.

8. The side-by-side vehicle according to claim 1, further comprising:
an air discharge duct which is connected to the continuously variable transmission, and guides the intake-air discharged from the continuously variable transmission to an outside region of the continuously variable transmission,
wherein the air discharge duct extends from the continuously variable transmission to a location that is forward of the loading space, and then extends in a vehicle width direction of the cargo carrier.

9. The side-by-side vehicle according to claim 6,
wherein the air-intake duct is removably mounted on the continuously variable transmission and the air-intake unit, at a location that is rearward of the riding space.

10. The side-by-side vehicle according to claim 1,
wherein the air-intake unit includes a hollow member provided with the air-intake passage and the air inlet, and a filter member removably fastened to the hollow member, the filter member of the air-intake unit being disposed to filter the intake-air flowing through the air-intake passage.

* * * * *